(12) United States Patent
Bian et al.

(10) Patent No.: US 10,755,401 B2
(45) Date of Patent: Aug. 25, 2020

(54) SYSTEM AND METHOD FOR WORK PIECE INSPECTION

(71) Applicant: General Electric Company, Schenectady, NY (US)

(72) Inventors: Xiao Bian, Niskayuna, NY (US); Arpit Jain, Niskayuna, NY (US); David Scott Diwinsky, West Chester, OH (US); Bernard Patrick Bewlay, Niskayuna, NY (US); Steeves Bouchard, Bromont (CA); Jean-Philippe Choiniere, Bromont (CA); Marc-Andre Marois, Bromont (CA); Stephane Harel, Bromont (CA); John Karigiannis, Bromont (CA)

(73) Assignee: General Electric Company, Schenectady, NY (US)

( * ) Notice: Subject to any disclaimer, the term of this patent is extended or adjusted under 35 U.S.C. 154(b) by 129 days.

(21) Appl. No.: 16/208,668

(22) Filed: Dec. 4, 2018

(65) Prior Publication Data
US 2020/0175669 A1 Jun. 4, 2020

(51) Int. Cl.
*G06T 7/00* (2017.01)
*H04N 5/235* (2006.01)

(52) U.S. Cl.
CPC .. *G06T 7/0004* (2013.01); *G06T 2207/10152* (2013.01); *G06T 2207/20076* (2013.01);
(Continued)

(58) Field of Classification Search
CPC ......... G06T 7/0004; G06T 2207/10152; G06T 2207/20076; G06T 2207/20084;
(Continued)

(56) References Cited

U.S. PATENT DOCUMENTS

| 6,480,792 B1 | 11/2002 | Prendergast |
| 7,333,898 B2 | 2/2008 | Griess et al. |

(Continued)

FOREIGN PATENT DOCUMENTS

WO 2017183923 A1 10/2017

OTHER PUBLICATIONS

Brotherton et al. "Prognosis of Faults in Gas Turbine Engines" IEEE Aerospace Conference; vol. 6; 2000 (10 pages).
(Continued)

*Primary Examiner* — Brandon J Miller
(74) *Attorney, Agent, or Firm* — The Small Patent Law Group LLC; Philip S. Hof

(57) ABSTRACT

An inspection system includes one or more imaging devices and one or more processors. The imaging devices generate a first set of images of a work piece at a first position relative to the work piece and a second set of images of the work piece at a second position relative to the work piece. At least some of the images in the first and second sets are acquired using different light settings. The processors analyze the first set of images to generate a first prediction image associated with the first position, and analyze the second set of images to generate a second prediction image associated with the second position. The first and second prediction images include respective candidate regions. The processors merge the first and second prediction images to detect at least one predicted defect in the work piece depicted in at least one of the candidate regions.

20 Claims, 8 Drawing Sheets

(52) U.S. Cl.
 CPC .............. *G06T 2207/20084* (2013.01); *G06T 2207/20221* (2013.01); *G06T 2207/30164* (2013.01); *H04N 5/2354* (2013.01)

(58) Field of Classification Search
 CPC ........... G06T 2207/20221; G06T 2207/30164; H04N 5/2354
 See application file for complete search history.

(56) References Cited

U.S. PATENT DOCUMENTS

| | | | |
|---|---|---|---|
| 7,379,845 | B2 | 5/2008 | Gorinevsky et al. |
| 8,700,235 | B2 | 4/2014 | Lastere et al. |
| 8,761,490 | B2 * | 6/2014 | Scheid ............... G01N 21/8851 382/145 |
| 9,719,774 | B2 * | 8/2017 | Ullrich ............... G01B 11/2441 |
| 9,785,919 | B2 | 10/2017 | Diwinsky et al. |
| 9,894,271 | B2 * | 2/2018 | Yoshikawa ........ H04N 5/23229 |
| 10,346,969 | B1 | 7/2019 | Raghu et al. |
| 2008/0243412 | A1 * | 10/2008 | Horie ................. G01N 21/9501 702/82 |
| 2015/0355101 | A1 | 12/2015 | Sun |
| 2016/0267647 | A1 | 9/2016 | Higo |
| 2018/0031490 | A1 * | 2/2018 | Okada ................. G01N 21/909 |
| 2018/0336674 | A1 | 11/2018 | Kim et al. |
| 2018/0357757 | A1 * | 12/2018 | Kuwasako ......... G01N 21/8851 |
| 2020/0110050 | A1 * | 4/2020 | Castaneda-Lopez ....................... G01N 27/028 |

OTHER PUBLICATIONS

Ronneberger et al. "U-Net: Convolutional Networks for Biomedical Image Segmentation" Computer Science and BIOSS Centre for Biological Signaling Studies; 2015 (8 pages).

He et al. "Deep Residual Learning for Image Recognition" CVPR; 2015 (9 pages).

Kordestani et al. "A New Fault Diagnosis of Multifunctional Spoiler System Using Integrated Artificial Neural Network and Discrete Wavelet Transform Methods" IEEE Sensors Journal; vol. 18, Issue 12; 2018 (11 pages).

Jaw "Neural Networks for Model-Based Prognosis" IEEE Aerospace Conference; vol. 3; 1999 (7 pages).

Padure et al. "Safety Measures in Testing Aircraft Wheeled Parts" 7th International Conference on Electronics, Computers and Artificial Intelligence; 2015 (3 pages).

Extended European Search Report for corresponding EP Application No. 19213157.1-1210 dated May 4, 2020 (10 pages).

Xie et al. "Deep Learning in Visual Computing and Signal Processing" Applied Computational Intelligence and Soft Computing vol. 2017; Jan. 2017 (14 pages).

Cha et al. "Deep Learning-Based Crack Damage Detection Using Convolution Neural Networks" Computer-Aided Civil and Infrastructure Engineering; vol. 32, No. 5; Mar. 2017 (18 pages).

* cited by examiner

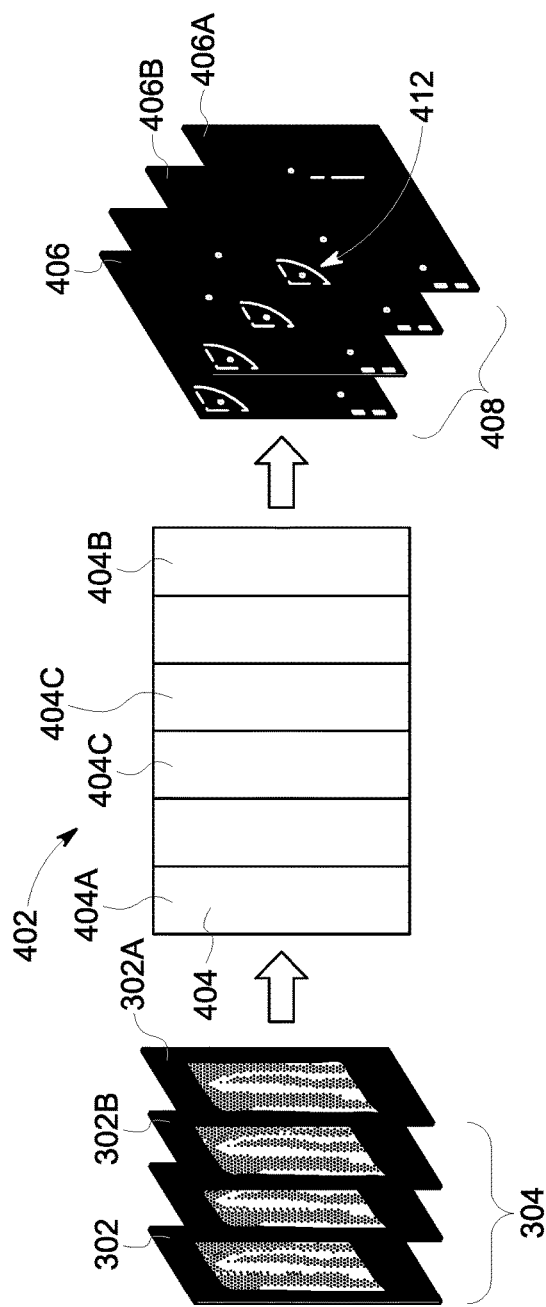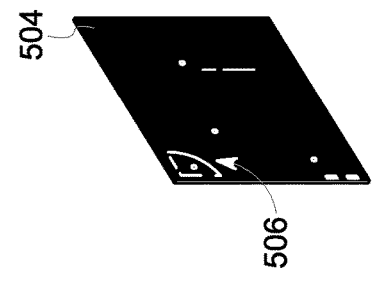
FIG. 4
FIG. 5

SYSTEM AND METHOD FOR WORK PIECE INSPECTION

FIELD

The subject matter described herein relates to inspection of work pieces for machine assemblies, such as aircraft engines.

BACKGROUND

Various machine assemblies utilized in vehicle and industrial applications, such as gas turbine engines, are regularly inspected to ensure safe and reliable performance of the machine assemblies. The regular inspections may be required as part of a service agreement. During an inspection, the machine assembly may be transported to a service shop, wherein the machine assembly is disassembled to its component parts. Various component parts or work pieces of the machine assembly are individually inspected for defects or anomalies, such as spallation, cracks, nicks, scratches, kinks, pits, or the like. The presence of defects or anomalies indicates that the part may be damaged and could risk the integrity of the machine assembly if reassembled into the machine assembly. Typically, such inspections are manually performed by a human operator that inspects the parts by hand. If the operator detects a defect, the operator may consider various factors such as the type of defect, the size of the defects, and the like, to determine whether to scrap or discard the part, repair the part, or approve the part for reuse within the machine assembly without repair.

Some known manual processes for detailed part inspection are subjective, inconsistent, inefficient, and inaccurate. For example, the process is subject to inherent human bias and/or error of the operator. Although there may be adopted guidelines or rules for the operator to follow when determining what constitutes a defect worthy of repairing the part and/or discarding the part, two different operators may have different interpretations and/or applications of the guidelines.

Furthermore, some known processes for detailed part inspection may be inaccurate based at least in part on inconsistent or limited lighting of the part. Lighting variations, specular reflection of the light from the part surface, view point variations, and the like, may result in defect prediction inaccuracies and uncertainties. For example, a particular defect on a surface of a work piece may not be sufficiently visible to an operator (or even an automated detection system) when illuminated by a first light that has a first incident angle relative to the surface and a first wavelength range and intensity, but the same defect may be readily noticeable when illuminated by a second light having a different incident angle, wavelength range, and/or intensity than the first light. Furthermore, a different defect in the surface of the part may be more noticeable under the first light than the second light. The accuracy and certainty of some known inspection processes may be compromised based on such inconsistent and/or limited lighting of the parts.

SUMMARY

In one or more embodiments, an inspection system is provided that includes one or more imaging devices and one or more processors. The one or more imaging devices are configured to generate a first set of images of a work piece at a first position of the one or more imaging devices relative to the work piece, and to generate a second set of images of the work piece at a second position relative to the work piece. At least some of the images in the first set are acquired using different light settings, and at least some of the images in the second set are acquired using the different light settings. The one or more processors are configured to obtain the first set of images and to analyze the first set to generate a first prediction image associated with the first position of the one or more imaging devices. The one or more processors are also configured to obtain the second set of images and to analyze the second set to generate a second prediction image associated with the second position of the one or more imaging devices. The first and second prediction images include respective candidate regions that depict a potential defect in a surface of the work piece. The one or more processors are configured to merge the first prediction image and the second prediction image to detect at least one predicted defect in the surface of the work piece. The at least one predicted defect is depicted in at least one of the candidate regions of the first and second prediction images.

In one or more embodiments, a method for inspecting a work piece for defects is provided. The method includes obtaining a first set of images of the work piece generated by one or more imaging devices at a first position of the one or more imaging devices relative to the work piece. At least some of the images in the first set are acquired using different light settings. The method includes obtaining a second set of images of the work piece generated by the one or more imaging devices at a second position of the one or more imaging devices relative to the work piece. At least some of the images in the second set are acquired using the different light settings. The method includes analyzing the first set of images via one or more processors to generate a first prediction image associated with the first position of the one or more imaging devices. The first prediction image includes a candidate region that depicts a potential defect in a surface of the work piece. The method includes analyzing the second set of images via the one or more processors to generate a second prediction image associated with the second position of the one or more imaging devices. The second prediction image includes a candidate region that depicts a potential defect in the surface of the work piece. The method also includes merging the first prediction image and the second prediction image via the one or more processors to detect at least one predicted defect in the surface of the work piece. The at least one predicted defect is depicted in at least one of the candidate regions of the first and second prediction images.

In one or more embodiments, an inspection system includes one or more imaging devices and one or more processors. The one or more imaging devices are configured to generate a first set of images of a work piece at a first position of the one or more imaging devices relative to the work piece, and to generate a second set of images of the work piece at a second position relative to the work piece. At least some of the images in the first set are acquired using different light settings, and at least some of the images in the second set are acquired using the different light settings. The one or more processors are configured to analyze the first set of images to generate a first prediction image by examining the images of the first set one at a time as inputs in a forward propagation direction through layers of artificial neurons in a first artificial neural network. The one or more processors are configured to analyze the second set of images to generate a second prediction image by examining the images of the second set one at a time as inputs in the forward propagation direction through the layers of artificial neurons in the first artificial neural network. The first and second prediction images include respective candidate regions that depict a potential defect in a surface of the work piece. The one or more processors are configured to merge the first prediction image and the second prediction image by examining the first and second prediction images as inputs in a forward propagation direction through layers of artificial neurons in a different, second artificial neural network that generates an output probability that at least one of the first and second prediction images depicts a defect. The one or more processors are configured to detect at least one predicted defect in the surface of the work piece responsive to the output probability exceeding a designated probability threshold.

BRIEF DESCRIPTION OF THE DRAWINGS

The inventive subject matter described herein will be better understood from reading the following description of non-limiting embodiments, with reference to the attached drawings, wherein below:

FIG. 4 illustrates a first set of images poised for examination using an artificial neural network during an initial processing stage according to an embodiment;

FIG. 5 illustrates a set of output images poised for analysis using a linear classifier or regression to generate a first prediction image according to the embodiment shown in FIG. 4;

DETAILED DESCRIPTION

The embodiments described herein provide an inspection system and method for detailed part inspection of work pieces. The work pieces may be components of a machine assembly, such as a gas turbine engine. The machine assembly may be used in a vehicle or an industrial application. For example, the machine assembly may be an aircraft engine. The inspection system and method may be more automated than some known part inspection methods, which are primarily manual. For example, computer vision and image processing techniques may be employed to fully or at least partially automate the inspection process, which may increase the accuracy, repeatability, consistency, robustness, and/or efficiency of the inspection process relative to some known inspection methods.

According to at least one embodiment, image data of a work piece is acquired using various imaging modalities, such as one or more different light settings to illuminate the work piece and one or more different cameras to capture the light reflected off the work piece to generate image data. Optionally, the various imaging modalities may include ultrasound, computed tomography (CT), thermal imaging, or the like, in addition to light-based imaging modalities. The image data is processed via one or more processors in two or more different stages. In one processing stage, a first set of images of the work piece is analyzed to generate a first initial defect prediction, and a different, second set of images of the work piece is separately analyzed to generate a second initial defect prediction. Then, in another processing stage, the information obtained from the first and second initial defect predictions is merged or fused to generate a final defect recognition result for the work piece. According to at least one embodiment, a machine learning algorithm, such as an artificial neural network, may be utilized to process the image data during one or both stages. The final defect recognition result indicates whether or not any defects are detected in the surface of the work piece. The final defect recognition result may be utilized to determine a subsequent action for the work piece, such as to reassemble the work piece in the machine assembly, repair the work piece, discard the work piece, or perform an additional inspection service, either automated or manual, on the work piece.

Figure 1:
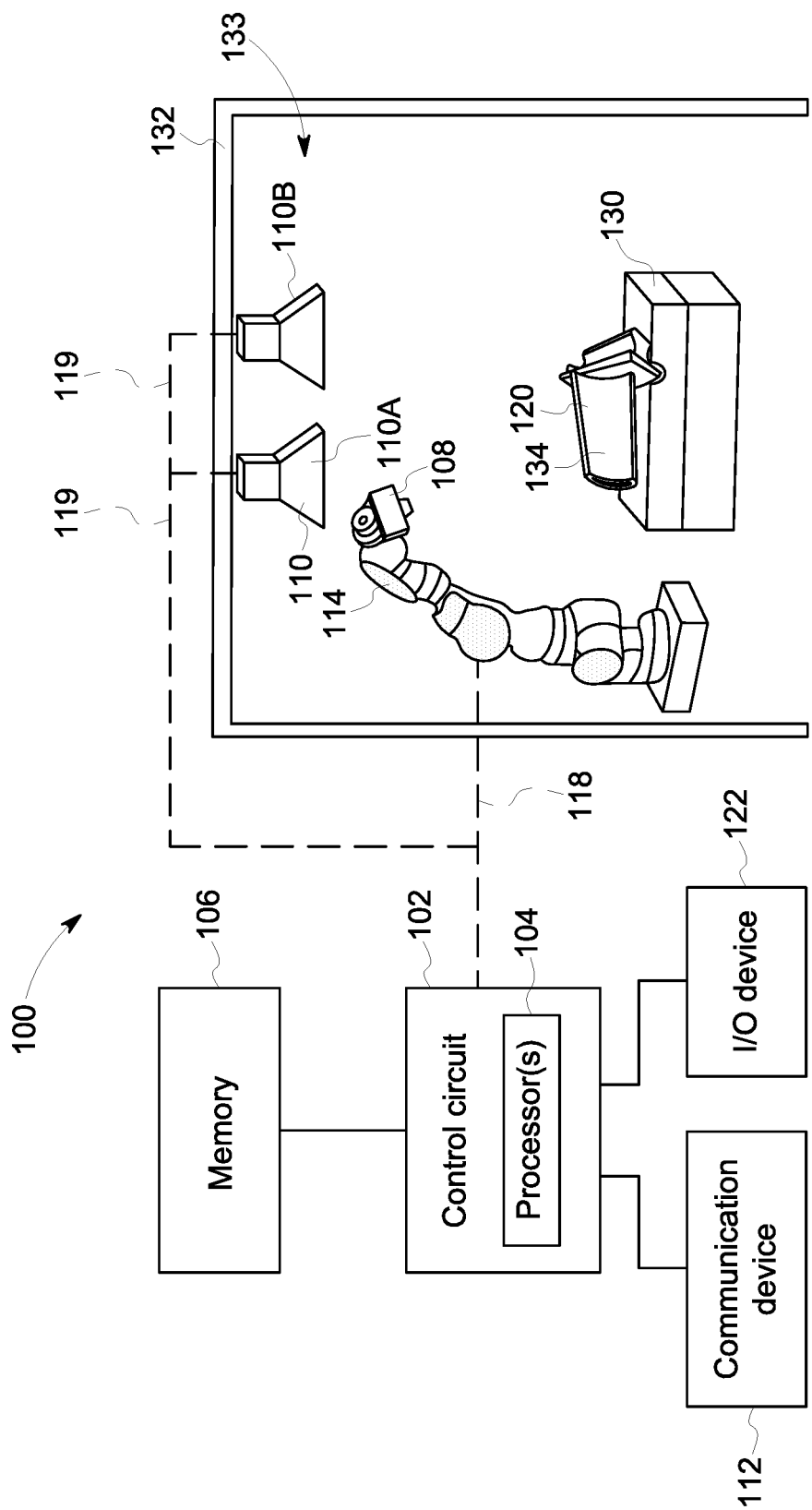
FIG. 1 is a block diagram of an inspection system according to an embodiment.

FIG. 1 is a block diagram of an inspection system 100 according to an embodiment. The inspection system 100 is configured to obtain multiple images of a work piece 120 to support detailed part inspection. The inspection system 100 includes one or more imaging devices 108 that are controlled to capture reflected energy for generating image data (e.g., still images and/or video frames) of the work piece 120 under different light modalities or settings. The inspection system 100 controls the one or more imaging devices 108 to acquire the images from at least one selected position relative to the work piece 120, and optionally from multiple different positions relative to the work piece 120. The inspection system 100 may be configured to automatically combine, fuse, and/or merge the image information acquired from different positions and/or different light settings to improve defect detection accuracy by reducing the influence of lighting variations, specular reflection variations, and view point variations in the inspection process.

The inspection system 100 includes a control circuit 102 that is operably connected to the one or more imaging devices 108, and is configured to obtain (e.g., receive or access) the image data generated by the one or more imaging devices 108. The control circuit 102 includes one or more processors 104 and associated circuitry. For example, the control circuit 102 includes and/or represents one or more hardware circuits or circuitry that include, are connected with, or that both include and are connected with the one or more processors 104, controllers, and/or other hardware logic-based devices. The control circuit 102 may include a central processing unit (CPU), one or more microprocessors, a graphics processing unit (GPU), or any other electronic component capable of processing inputted data according to specific logical instructions.

The control circuit 102 analyzes the image data to determine the presence or absence of defects along a surface 134 of the work piece 120 based on automated image analysis of the image data depicting the surface 134. Upon making a final prediction regarding whether the work piece 120 has any defects, the control circuit 102 may generate a control signal to control a subsequent action and/or destination for the work piece 120 based on the final prediction. For example, the work piece 120 may be advanced to a subsequent assembly or inspection stage if the work piece 120 is determined to have no defects or only minor defects. If the work piece 120 is determined to have at least one significant, actionable (e.g., non-negligible) defect, the control circuit 102 may generate a control signal to group the work piece 120 with other work pieces that also have detected defects, and/or the control signal may schedule the work piece 120 for repair, discard, and/or additional inspection.

The inspection system 100 may be an automated system that illuminates the work pieces 120, generates the image data of the reflected light, and analyzes the image data to determine the presence of defects on the work pieces 120 without requiring human operator intervention. Optionally, an operator may selectively intervene in the inspection process by making operator input selections using a control device that is operably connected to the control circuit 102. For example, the inspection system 100 optionally includes an input/output (I/O) device 122 that can be utilized by an operator to participate in the inspection process.

The input/output (I/O) device 122 of the inspection system 100 includes at least one display device and at least one user input device that allow an operator to interact with the inspection system 100. The I/O device 122 is operably connected to the control circuit 102. The display may be a liquid crystal display (e.g., light emitting diode (LED) backlight), an organic light emitting diode (OLED) display, a plasma display, a CRT display, and/or the like. The user input device may be a touchpad, a touchscreen, a mouse, a keyboard, physical buttons, or the like, that is configured to receive inputs from the operator. In an embodiment, an operator may participate in the inspection by utilizing the I/O device 122. For example, the operator may use the display to view the results of the detailed part inspection and for selecting additional actions, such as scheduling repair of the work piece 120. The I/O device 122 optionally includes additional outputs, such as audio speakers, vibrating devices, or the like, for alerting the operator.

The control circuit 102 may be operably connected to a memory storage device 106 (referred to herein as memory 106). The memory 106 is a tangible and non-transitory computer readable medium. The memory 106 may include or represent a flash memory, RAM, ROM, EEPROM, and/or the like. The control circuit 102 may execute programmed instructions stored on the memory 106 or stored on another tangible and non-transitory computer readable medium. For example, the control circuit 102 may perform various steps of the inspection process described herein by executing the programmed instructions stored on the memory 106. The control circuit 102 and the memory 106 may obtain the image data of the work piece 120 directly from the one or more imaging devices 108, or indirectly via a storage device or a remote server. The control circuit 102 is operably connected to the one or more imaging devices 108 via a wired or wireless communication link 118. The image data obtained from the imaging device 108 may be stored in the memory 106 or stored in another storage device that is accessible to the control circuit 102.

The inspection system 100 inspects work pieces 120 having various shapes and sizes. For example, the work piece 120 may be a metal or composite component of an engine or other machinery for vehicular and/or industrial applications. In the illustrated embodiment, the work piece 120 is a rotor blade of a rotor assembly, such as a compressor or turbine. The rotor blade may be a component of a gas turbine engine of an aircraft or another vehicle. Non-limiting examples of other types of work pieces 120 that may be inspected by the inspection system 100 include combustor liners, nozzles, shafts, wheels, pistons, and the like. Optionally, the surface 134 of the work piece 120 may be coated with a thermal barrier coating that has heat-resistant properties for protecting the underlying materials from high temperatures during operation, such as combustion temperatures within a gas turbine engine.

The work piece 120 may be disposed on a base 130 or platform. The work piece 120 may remain stationary in a fixed position on the base 130 throughout the inspection process. For example, the work piece 120 may remain stationary while the one or more imaging devices 108 and/or one or more light sources 110 move relative to the work piece 120 during the inspection process. Alternatively, the work piece 120 may be rotated during the inspection process by controlling the base 130 to swivel about a vertical axis. For example, the base 130 may be or include a turn table that rotates to adjust a position of the work piece 120 relative to the imaging device 108. The work piece 120 may be rotated to direct the light that is reflected off the surface 134 towards the one or more imaging devices 108 that capture the reflected light to generate the image data. Although only one work piece 120 is shown in FIG. 1, the base 130 may be a tray that holds multiple work pieces 120 side by side for consecutive inspection of the work pieces 120 on the tray.

The one or more imaging devices 108 may be or include at least one camera, sensor, scanner, or the like. The one or more imaging devices 108 are configured to generate images in different light settings, such as in an ultraviolet (UV) light setting, an infrared (IR) light settings, and/or a visible light setting. The one or more imaging devices 108 may include multiple imaging devices, such as a UV camera that generates UV image data, a visible light camera that generates visible light image data, and/or an IR camera that generates IR image data. Alternatively, the one or more imaging devices 108 may be a single imaging device 108 that includes different hardware for capturing different types of energy and generating different types of image data, such as UV images and visible light images. The following description refers to the one or more imaging devices 108 in the singular as imaging device 108, although it is recognized that the inspection system 100 may have multiple imaging devices 108.

The imaging device 108 may have one or more filters and/or lenses designed to restrict the wavelengths permitted through the filters and/or lenses. For example, the imaging device 108 may have a barrier filter that permits only light within a certain band of wavelengths in the visible light spectrum to penetrate the filter, excluding other wavelengths present in ambient light and/or white light. In addition, or alternatively, the imaging device 108 may have a barrier filter that permits only light within a certain band of wavelengths in the UV light spectrum to penetrate the filter. The imaging device 108 generates images that represent the subject matter in a field of view of the imaging device 108 at the time that the specific reflected light rays were monitored.

In the illustrated embodiment, the imaging device 108 is mounted on a robotic arm 114 that is able to move the imaging device 108 along multiple axes (e.g., lateral, longitudinal, and vertical) relative to the work piece 120. In addition to changing a location of the imaging device 108, the robotic arm 114 can adjust an angle of the imaging device 108 relative to the work piece 120. The robotic arm 114 is operably connected to the control circuit 102 via the wired or wireless communication link 118. For example, the control circuit 102 controls the robotic arm 114 to move the imaging device 108 to specific selected positions in space. Each selected position has specific locational coordinates (e.g., x, y, z) in a coordinate system, and specific angular coordinates (e.g., rx, ry, rz). For example, a given position of the imaging device 108 refers to both the location and the angle of the imaging device 108. The location and angle may be relative to the work piece 120 or to another reference point. Alternatively, at least one of the location or the angle may be an absolute value. The control circuit 102 may control the robotic arm 114 to move the imaging device 108 from a first position to a second position by (i) changing the location of the imaging device 108 only, (ii) changing the angle of the imaging device 108 only, or (iii) changing both the location and the angle of the imaging device 108. The robotic arm 114 may have various actuators and/or axes of rotation to manipulate the imaging device 108 as directed by the control circuit 102.

The inspection system 100 includes one or more light sources 110 that are operably connected to the control circuit 102 via one or more wired and/or wireless communication links 119. The illustrated embodiment shows a first light source 110A and a second light source 110B, but the inspection system 100 may have more than two light sources 110 or only one light source 110 in other embodiments. The light sources 110 may be configured to generate and emit illumination light that illuminates the surface 134 of the work piece 120. The imaging device 108 monitors the rays of illumination light that reflect off the surface 134 towards the imaging device 108 to generate the image data. The two light sources 110A, 110B may be the same or different types of light sources. One or both light sources 110A, 110B may be an LED, a laser, an incandescent light, and/or the like. The two light sources 110A, 110B may be spaced apart from each other and have different positions relative to the work piece 120, such that each provides illumination light with a different incident angle relative to the surface 134 of the work piece 120. One or both of the light sources 110A, 110B may have a filter for controlling a wavelength or range of wavelengths of light emitted therefrom. One or both of the light sources 110A, 110B may have one or more lenses and/or mirrors for controlling a direction that the generated light is emitted.

The control circuit 102 is configured to independently operate the light sources 110 to provide different light settings. For example, the control circuit 102 may control when each of the light sources 110A, 110B is activated (e.g., emitting light) and deactivated (e.g., not emitting light). The control circuit 102 may also control the characteristics of the light generated by each of the light sources 110A, 110B, such as the light intensity, wavelength, range of wavelengths, uniformity, polarity, and the like. Although the light sources 110A, 110B are discrete and separate from one another in the illustrated embodiment, the light sources 110A, 110B may share one or more components in an alternative embodiment, such as a common housing. Optionally, the light sources 110A, 110B may be a single light source that is capable of generating light at different characteristics dictated by the control circuit 102. For example, a single light source 110 may be controlled by the control circuit 102 to generate different intensities, wavelengths, or the like, of light, at different times or at the same time using the same or different light sources (e.g., light emitting diodes) in the light source 110.

The inspection system 100 optionally includes a shroud structure 132 that surrounds the work piece 120. The light sources 110A, 110B are mounted on and/or within the shroud structure 132 and emit light into a chamber 133 defined by the shroud structure 132. The shroud structure 132 may shield the inspection from external light, such as ambient or white light, to enable better control over the lighting conditions during the inspection process. The shroud structure 132 may be a tent, drapes, rigid walls, or the like. In an alternative embodiment, at least one of the light sources 110A, 110B is mounted on the first robotic arm 114 with the imaging device 108, instead of being mounted remote from the robotic arm 114 on the shroud structure 132.

The control circuit 102 may be operably connected to a communication device 112 of the inspection system 100 that includes hardware such as a transceiver, receiver, transmitter, modem, router, and/or the like, and associated circuitry (e.g., antennas). The communication device 112 may be controlled by the control circuit 102 to communicate with one or more of the components of the inspection system 100, such as the imaging device 108, the light sources 110, and/or the robotic arm 114. The communication device 112 in addition or alternatively may wirelessly connect the control circuit 102 to another device, such as a remote server, a mobile device (e.g., held by an operator), or the like.

Optionally, the control circuit 102, the memory 106, the communication device 112, and the I/O device 122 may be components within a common device, such as a computer (e.g., desktop, laptop, tablet, smart phone, mobile work station, etc.). For example, the control circuit 102, the memory 106, the communication device 112, and the I/O device 122 may be commonly surrounded by a housing or case. The communication device 112 and the I/O device 122 may be optional components of the inspection system 100, such that alternative embodiments may lack one or both of the devices 112, 122.

The inspection system 100 optionally may include additional components other than the components shown in FIG. 1, such as additional imaging devices, additional light sources, or the like. The inspection system 100 optionally may have at least some different components than the components shown in FIG. 1. For example, in an alternative embodiment, the inspection system 100 may have a second robotic arm that holds that work piece 120 instead of the base 130.

The inspection system 100 according to one or more embodiments automatically performs all, or at least a portion of, an inspection process to detect defects on the work piece 120. The inspection process includes (i) an image acquisition stage in which image data of the work piece 120 is obtained at different positions of the imaging device 108 and/or under different light settings, (ii) an initial processing stage in which multiple images of the work piece 120 are fused together and processed to generate multiple prediction images, and (iii) a secondary processing stage in which the prediction images are merged and analyzed to make a final determination whether or not the work piece 120 has any defects. As described in more detail herein, the initial processing stage may analyze and aggregate multiple images generated from the same position of the imaging device 108 using different light settings, and the secondary processing stage analyzes the information generated by the initial processing stage to aggregate the information across different positions of the imaging device 108 relative to the work piece 120.

During the image acquisition stage, the control circuit 102 controls the imaging device 108 and the light sources 110 to generate image data of the work piece 120 from multiple different perspectives and under different light settings or configurations. The different perspectives may be achieved by moving the imaging device 108 relative to the work piece 120, or vice-versa. The different light settings may be achieved by selecting and/or changing the locations of the light sources 110A, 110B, how many and/or which of the light sources 110A, 110B is activated and emitting illumination light toward the work piece 120, the wavelengths or wavelength ranges of the illumination light generated by the one or more activated light sources 110, the intensity of the illumination light, and/or the like.

Figure 2:
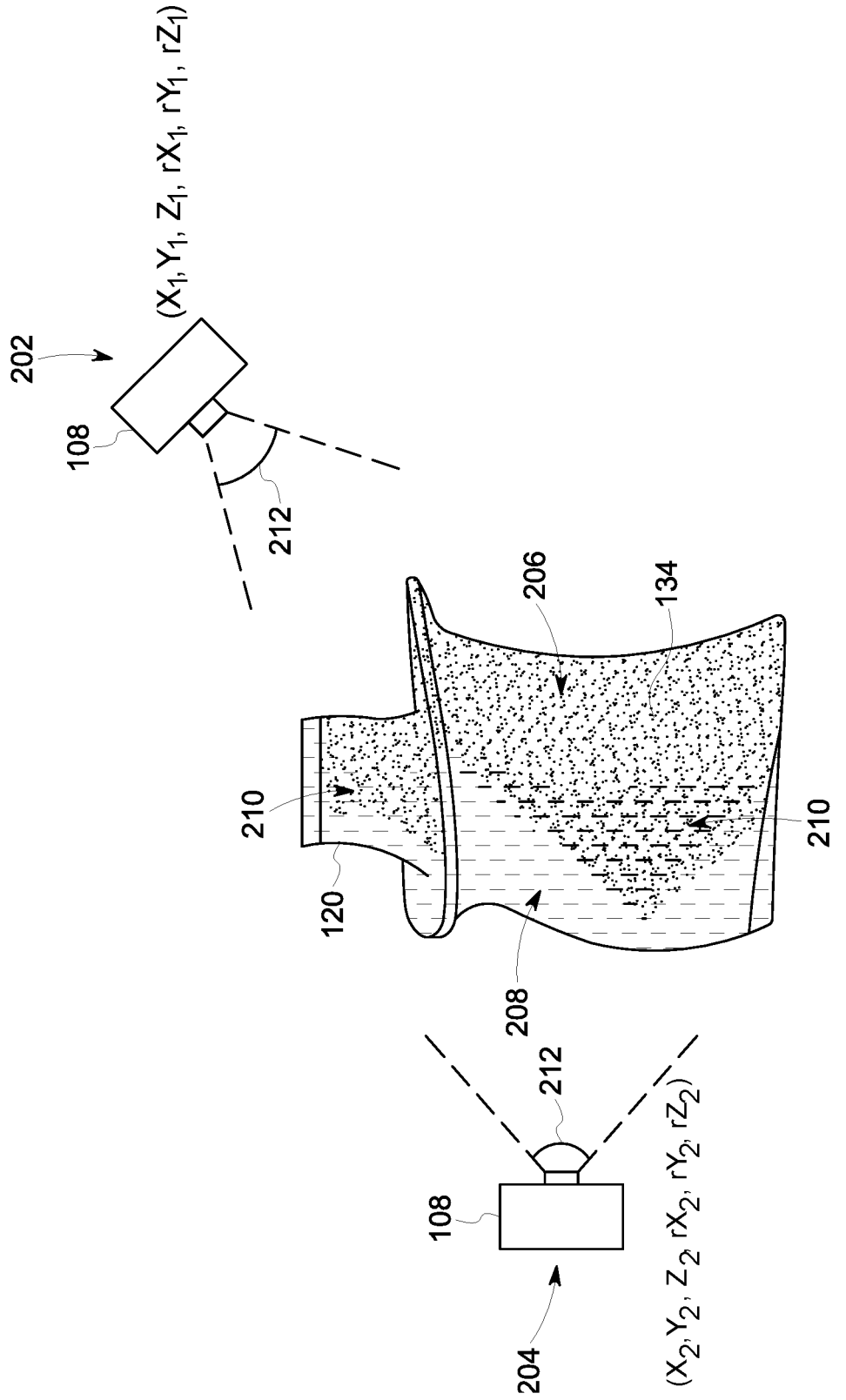
FIG. 2 illustrates an imaging device of the inspection system at two different positions relative to a work piece according to an embodiment.

FIG. 2 illustrates the imaging device 108 at two different positions relative to the work piece 120 according to an embodiment. For example, the imaging device 108 is shown at a first position 202 and a second position 204 relative to the work piece 120. The first position 202 has location coordinates ($x_1$, $y_1$, $z_1$) and angle coordinates ($rx_1$, $ry_1$, $rz_1$). The location coordinates refer to positions along three orthogonal axes, such as a lateral axis, a vertical or height axis, and a longitudinal or depth axis. The two angle coordinates refer to angles in two perpendicular planes. For example, the robotic arm 114 may be configured to tilt and rotate the imaging device 108 in two perpendicular planes to achieve various angles. The second position 204 has location coordinates ($x_2$, $y_2$, $z_2$) and angle coordinates ($rx_2$, $ry_2$, $rz_2$). Both the location and the angle of the second position 204 differ from the location and the angle of the first position 202.

The control circuit 102 may designate the first and second positions 202, 204 as the positions of the imaging device 108 at which to acquire images of the work piece 120 during the image acquisition stage. The total number of positions of the imaging device 108, including the locations and angles thereof, may be calculated by the control circuit 102 based on various factors such as the field of view of the imaging device 108, the size of the surface 134 of the work piece 120 to be inspected, the complexity and/or curvature of the surface 134 (e.g., surface topology), and the like. The control circuit 102 may utilize a computer design model of the work piece 120 to determine measurements and features of the work piece 120 that are factored into the calculation. The calculation may also depend on designated constraints, such as maximum permitted angle from a normal axis of the surface 134. For example, an acceptable range of angles from the normal axis may be within 45 degrees, within 30 degrees, within 20 degrees, or within 10 degrees from the normal axis. This angular constraint may be implemented to ensure that the imaging device 108 is relatively orthogonal to the surface 134 to receive a sufficient amount of light reflected from the surface 134. Another constraint may dictate that the entire surface 134 of the work piece 120 is captured and depicted in the images acquired at the one or more selected positions, to ensure that the entire surface 134 is inspected for defects.

FIG. 2 shows a coverage area 206 (represented by dot shading in FIG. 2) that would be captured by the imaging device 108 at the first position 202 with a set field of view 212 of the imaging device 108. FIG. 2 also shows a different coverage area 208 (represented by dash shading in FIG. 2) that would be captured by the imaging device 108 at the second position 204 with the same field of view 212. The coverage area 206 is generally along the right half of the work piece 120 in FIG. 2, and the coverage area 208 is generally along the left half of the work piece 120. There are overlapping areas 210 in which the coverage areas 206, 208 overlap, indicating that these portions of the work piece 120 would be captured in an image acquired at each of the two positions 202, 204. As shown in FIG. 2, the combination of the two coverage areas 206, 208 covers the entire inspection surface 134 of the work piece 120.

Although two positions of the imaging device 108 are selected for the inspection in the illustrated embodiment, in other embodiments the control circuit 102 may select only one position or more than two positions. For example, if the imaging device 108 is able to capture the entire inspection surface 134 of the work piece 120 from a single position in satisfaction of all assigned constraints, then the control circuit 102 may select the single position for capturing the image data instead of multiple positions.

During the image acquisition, the imaging device 108 is controlled to generate a first set of images of the work piece 120 at the first position 202, and to generate a second set of images of the work piece 120 at the second position 204. At least some of the images in the first set are generates using different light settings in the surrounding environment. Similarly, at least some of the images in the second set are generated using different light settings in the surrounding environment, which may be the same as the different light settings used to generate the first set of images.

Figure 3:
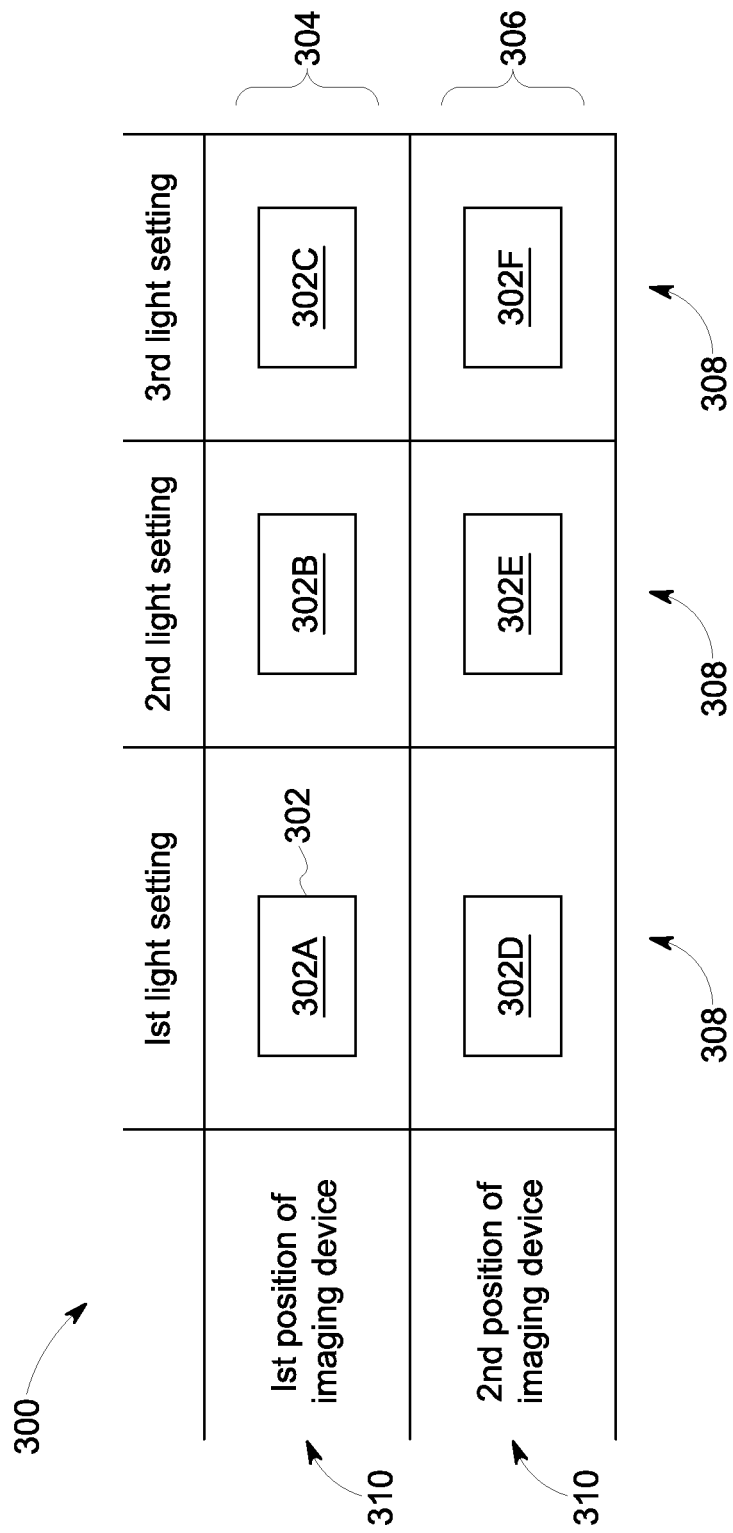
FIG. 3 shows a chart depicting various images generated by the imaging device in different light settings of the inspection system according to an embodiment.

Reference is now made to FIG. 3, which shows a chart 300 depicting various images 302 (e.g., images 302A-302F) generated by the imaging device 108 (shown in FIG. 1) in different light settings of the inspection system 100 according to an embodiment. The chart 300 has three columns 308 that represent different light settings, and two rows 310 that represent two different positions of the imaging device 108, such as the two positions 202, 204 shown in FIG. 2. The images 302 shown in FIG. 3 all depict the same work piece 120. Although the work piece 120 may be depicted in all of the images 302, the image data in each of six images 302A-302F shown in FIG. 3 may be at least slight partially different from the other images 302A-302F because each of the images 302A-302F is generated at a different camera perspective and/or a different lighting environment than the other images 302A, 302F. For example, the image 302A is generated by the imaging device 108 in the first position in a first light setting. The image 302E is generated by the imaging device 108 in the second position in a second light setting. In one or more embodiments, the inspection system 100 is configured to analyze and process all six images 302A-302F to predict whether or not the work piece 120 has any defects, and, if so, to determine the location of such defect(s).

During the image acquisition stage, the control circuit 102 controls the imaging device 108 to generate a first set 304 of images 302 of the work piece 120 and a second set 306 of images 302 of the work piece 120. The first set 304 includes the images 302A-302C generated by the imaging device 108 in the first position relative to the work piece 120. The second set 306 includes the images 302D-302F generated by the imaging device 108 in the second position relative to the work piece 120. The three images 302A-302C in the first set 304 differ from one another based on different light settings. For example, the control circuit 102 controls the light sources 110A, 110B to provide a first light setting during the time that the imaging device 108 captures the reflected light to generate the first image 302A. The control circuit 102 controls the light sources 110A, 110B to provide a second light setting to capture the reflected light used to generate second image 302B, and to provide a third light setting to capture the reflected light used to generate the third image 302C. Similarly, the fourth image 302D of the second set 306 is generated using the first light setting, the fifth image 302E is generated using the second light setting, and the sixth image 302F is generated using the third light setting.

In a first non-limiting example, the control circuit 102 may provide the first light setting by activating the first light source 110A and deactivating the second light source 110B (or maintaining the second light source 110B in a deactivated state), such that only the first light source 110A generates light to illuminate the work piece 120. The control circuit 102 may provide the second light setting by deactivating the first light source 110A and activating the second light source 110B, such that only the second light source 110B generates light to illuminate the work piece 120. The control circuit 102 may provide the third light setting by activating both the first and second light sources 110A, 110B such that both light sources 110A, 110B emit light to illuminate the work piece 120. By activating both light sources 110A, 110B, the illumination light in the third light setting may have a broader band of wavelengths and/or a greater intensity than the illumination light in the first and second light settings.

The first light source 110A may emit light with different properties than the second light source 110B. For example, the first light source 110A may emit a different wavelength or range of wavelengths than the second light source 110B. The first light source 110A may emit light in the visible band of wavelengths, and the second light source 110B may emit light in the IR band of wavelengths, or the two light sources 110A, 110B may emit light having different wavelength ranges within the same band (e.g., visible, IR, UV, broad spectrum, narrow spectrum, or the like). In another example, the first light source 110A may emit light with a different intensity than the light emitted by the second light source 110B. Optionally, the first and second light sources 110A, 110B may generate light with the same or similar properties as one another, but the different positions (e.g., locations and/or angles) of the light sources 110A, 110B relative to the work piece 120 yield the variance in the images under the different light settings.

In another non-limiting embodiment, the control circuit 102 may control both the first light source 110A and the second light source 110B to generate light during aa three light settings, or at least two light settings, and may differentiate the light settings by changing a wavelength (or wavelength range) of the illumination light emitted by the light sources 110A, 110B, changing an intensity of the illumination light emitted by the light sources 110A, 110B, and/or changing a position of at least one of the light sources 110A, 110B relative to the work piece 120. For example, one or both light sources 110A, 110B may be mounted on a movable device, such as a robotic arm, that can move the respective light source 110A, 110B on command.

The control circuit 102 may control the robotic arm 114 (shown in FIG. 1) to move the imaging device 108 to the first position 202 (FIG. 2). At the first position 202, the imaging device 108 consecutively generates images of the same work piece 120 under each of the different designated light settings to generate the three images 302A, 302B, 302C in the first set 304. Then, the control circuit 102 may control the robotic arm 114 to move the imaging device 108 to the second position 204 (FIG. 2) to consecutively generate the three images 302D, 302E, 302F in the second set 304 under the different light settings. The order in which the images 302 are generated may be altered or reversed from the order that is described. Although the chart 300 in FIG. 3 shows two designated positions of the imaging device 108 and three designated light settings, it is understood that the imaging device 108 may be controlled to generate images of a common work piece 120 at more or less than two positions in an alternative embodiment. Furthermore, the control circuit 102 may control the light sources 110 to provide more or less than three different light settings in an alternative embodiment. The control circuit 102 may obtain (e.g., access or receive) the images 302 generated by the imaging device 108 all at once or one by one during the image acquisition stage.

The initial processing stage follows the image acquisition stage. During the initial processing stage, multiple images of the work piece 120 are fused together and processed to generate multiple prediction images. For example, the images 302A, 302B, 302C of the first set 304 may be fused together and analyzed to generate a first prediction image, and the images 302D, 302E, 302F of the second set 306 may be fused together and analyzed to generate a second prediction image. The first prediction image is associated with the first position of the imaging device 108 because the images 302 in the first set 304 are generated with the imaging device 108 in the first position relative to the work piece 120. Similarly, the second prediction image is associated with the second position of the imaging device 108 because the images 302 in the second set 306 are generated with the imaging device 108 in the second position relative to the work piece 120. Optionally, if images 302 are generated of the work piece 120 from more than two different positions relative to the work piece 120, then the inspection system 100 may generate more than two prediction images.

In at least one embodiment, the images 302 of the different sets 304, 306 are analyzed during the initial processing stage using a machine learning algorithm (e.g., convolutional neural network algorithms, deep learning algorithms, decision tree learning algorithms, and/or the like) to provide automated object-of-interest detection and recognition. For example, the control circuit 102 is configured to analyze the images 302A-302C of the first set 304 by examining the images 302A-302C one at a time as inputs in a forward propagation direction through layers of artificial neurons in an artificial neural network. The control circuit 102 separately analyzes the images 302D-302F of the second set 306 by examining the images 302D-302F one at a time as inputs in the forward propagation direction through the layers of artificial neurons in the artificial neural network. The initial processing stage is configured to determine if potential defects are present in the surface 134 (shown in FIG. 1) of the work piece 120 (FIG. 1). Any discovered potential defects are further examined during the subsequent secondary processing stage.

FIG. 4 illustrates the first set 304 of images 302 poised for examination using an artificial neural network 402 during the initial processing stage according to an embodiment. The first set 304 of images 302 in FIG. 4 has four images 302, instead of the three 302A-302C shown in FIG. 3, but it is recognized that all four images 302 in the set 304 are captured by the imaging device 108 at the same position (e.g., the position 202 shown in FIG. 2) relative to the work piece 120. The artificial neural network 402 (also referred to herein as neural network 402) may be stored within the memory 106 or may be stored remote from the memory 106 and the control circuit 102. For example, the communication device 112 may communicate the images to the neural network 402 on a remote device, and the communication device 112 may receive a result message from the remote device that provides output probabilities generated by the neural network 402.

The neural network 402 is formed from one or more processors (e.g., microprocessors, integrated circuits, field programmable gate arrays, or the like). The neural network 402 is divided into two or more layers 404, such as one or more input layers 404A that receive an input image, one or more output layers 404B that output an output image 406, and one or more intermediate layers 404C between the input layer(s) 404A and the output layer(s) 404B. The layers 404 of the neural network 402 represent different groups or sets of artificial neurons or nodes, which can represent different functions performed by the one or more processors on the input images to identify objects or features in the input images. The artificial neurons apply different weights in the functions applied to each input image to attempt to identify objects of interest in the input image. For detecting defects in the work piece 120, the artificial neurons in the various layers 404 individually examine the images 302 to recognize defects in the surface 134 as the objects of interest, such as cracks, spalling, chips, nicks, abrasions, and the like.

The artificial neurons in the layers 404 of the neural network 402 can examine individual pixels of each image 302 input into the neural network 402. The neural network 402 may assign or associate different pixels with different object classes based on analysis of characteristics of the pixels. An object class is a type or category of an object appearing in the image. In general, a human body and an automobile can be two different object classes. More specific object classes for the inspection system 100 described herein may include a crack as one object class, an intact (undamaged) surface of the work piece 120 as another object class, a background environment behind the work piece 120 as another object class, a spalling or flaking region as still another object class, and the like.

Each pixel analyzed in the neural network 402 can be labeled (e.g., associated) with a probability that the pixel represents various different object classes. For example, the artificial neuron (e.g., processors) can use linear classification to calculate classification scores for the different object classes or categories, and the classification scores indicate probabilities that a pixel represents each of various object classes. The classification score for a given pixel can be represented as a vector [a b c d], where the values of a, b, c, and d indicate the probability of the pixel representing each of different object classes. The classification score is referred to herein as a classification vector. Each artificial neuron can apply a mathematical function, such as an activation function, to the same pixel, with the functions applied by different neurons impacting the functions applied by other neurons. Different neurons may apply different weights to different terms in the functions than one or more, or all other neurons. Application of the functions generates the classification vectors for the pixels in the images 302, which can be used to identify defects in the work piece 120 depicted in the images 302. The neural network 402 may not be 100% accurate in predicting what objects are represented by different pixels, so the output images 406 are prediction-based.

The neurons in the layers 404 of the neural network 402 determine the classification vectors for the various pixels in the images 302 examining characteristics of the pixels, such as the intensities, colors (e.g., wavelengths), and/or the like. The layers 404 of artificial neurons in the neural network 402 can examine each input image 302 in sequential order, with the neurons of one intermediate (or hidden) layer 404C examining a given pixel, followed by the neurons in an adjacent intermediate layer 404C, and so on, to calculate the classification vectors of the given pixel. The results of functions applied to characteristics of a pixel by the neurons in preceding layers 404 of the neural network 402 influence the application of functions by the neurons in subsequent layers 404.

After the layers 404 of the neural network 402 have determined the classification vectors for the pixels, the neural network 402 examines the classification vector of each pixel and determines the highest probability object class for each pixel. For example, a first pixel in the image 302A having a classification vector of [0.6 0.15 0.05 0.2] indicates that the neural network 402 calculates a 60% probability that the first pixel represents a first object class (e.g., a defect in the form of a crack), a 15% probability that the first pixel represents a second object class (e.g., an intact or undamaged area of the surface of the work piece), a 5% probability that the first pixel represents a third object class (e.g., background behind the work piece), and a 20% probability that the first pixel represents a fourth object class (e.g., a defect in the form of spalling or flaking of a coating on the work piece).

The output images 406 may be representations based on the determined probabilities for the individual pixels in the corresponding input images 302. For example, a first output image 406A is generated based on the examination of the first image 302A of the set 304, and a second output image 406B is generated based on the examination of the second image 302B of the set 304. The neural network 402 can determine that each pixel represents the object class having the greatest or largest probability in the corresponding classification vector for that pixel. For example, the neural network 402 may determine that the first pixel described above represents a portion of a crack-type defect due to the 60% probability of being the crack object class. The selected probability may be used to convert the classification vector of the corresponding pixel to a one-hot vector. For example, the classification vector [0.6 0.15 0.05 0.2] described above would be converted to the one-hot vector [1 0 0 0], indicating that the pixel is determined to be part of a defect in the form of a crack. The output image 406 is generated such that each pixel having the one-hot vector associated with the crack object class is displayed in the output image 406 as having the properties or characteristics of a crack (e.g., wavelength, intensity, etc.). The same is true for pixels predicted to be in the other object classes.

This process can be repeated for all (or at least some) of the pixels in each of the images 302 of the first set 304 to generate a set 408 of the output images 406. For example, the images 302 in the first set 304 are examined one at a time through the layers 404 of the neural network 402. The first image 302A may be examined through the layers 404 prior to the second image 302B. The neural network 402 generates a different output image 406 based on each of the input images 302.

Weight values associated with each vector and neuron in the neural network 402 constrain how the input images are related to outputs of the neurons. The weight values can be determined by the iterative flow of training data through the neural network 402. For example, weight values may be established during a training phase in which the neural network 402 learns how to identify particular object classes by typical input data characteristics of the objects in training or ground truth images. For example, the neural network 402 is trained to detect specific defects, such as cracks, spalling (e.g., flaking), abrasions, chips, and the like. During the training phase, labeled training or ground truth images are input into the artificial neural network 402. A labeled training image is an image where all or a substantial portion of the pixels forming the image are associated with known object classes. In a labeled training image, a pixel labeled as [1 0 0 0] indicates that there is a 100% probability that the pixel represents at least a portion of an object in the first object class (e.g., a crack), and a zero percent probability that the pixel represents at least a portion of an object of any of second, third, or fourth object classes (e.g., intact area, background, or spalling).

Additional training of the neural network 402 using labeled training images or ground truth images can improve the accuracy of the neural network 402 at recognizing objects in images that are input into the neural network 402, such that the areas and objects in the output images 406 more closely resemble the corresponding areas and objects in the input images 302. The training modifies the weights and/or functions of the artificial neurons in the different layers 404, which may result in greater gaps in the probabilities for different object classes. For example, additional training may increase a probability that a pixel is within a first object class and decrease a probability that the pixel is within a second object class, increasing the confidence that the pixel is in the first object class as opposed to the second object class.

In an embodiment, the neural network 402 is a convolutional neural network. For example, the input layer 404A and some of the intermediate layers 404C proximate to the input layer 404A may represent an encoder that encodes the information or data extracted from the images 302. The output layer 404B and other intermediate layers 404C proximate to the output layer 404B may represent a decoder that upsamples the information.

The output images 406 generated by the neural network 402 may have candidate regions 412 that contain pixels that are recognized as potential defects. The candidate regions 412 are identified for further examination to confirm whether the potential defects are actually defects or merely false positives. In an embodiment, the output images 406 are defect masks. For example, because each of the pixels of the output images 406 are predicted to be one of a specific set of object classes, the neural network 402 may be configured to black out the pixels in the defect masks 406 that are associated with specific object classes deemed irrelevant to the object detection. The pixels predicted to represent background behind the work piece 120 may be blacked out in the defect masks 406. Optionally, at least a portion of the pixels predicted to represent the work piece 120 may be blacked out as well. For example, the pixels that are predicted to depict the surface of the work piece 120 and that are outside of any identified candidate regions 412 may be blacked out. The pixels within the candidate regions 412 are not blacked out. Optionally, the boundaries of the candidate regions 412 may be delineated using rectangular bounding boxes such that the candidate regions 412 have regular shapes.

FIG. 5 illustrates the set 408 of output images 406 or defect masks poised for analysis using a linear classifier or regression 502 to generate a first prediction image 504 according to the embodiment shown in FIG. 4. After generating the defects masks 406 that are based on the first set 304 of images 302 associated with the first position of the imaging device 108 (shown in FIG. 1), a fusion process is utilized to combine or merge the defect masks 406. The fusion process generates a single prediction image 504 based on all defect masks 406 in the set 408. For example, information from the defect masks 406 may be aggregated or merged to produce the prediction image 504. The prediction image 504 is associated with the first position of the imaging device 108 relative to the work piece 120. The prediction image 504 may include one or more candidate regions 506 that depict a potential defect in the surface 134 of the work piece 120.

The defect masks 406 may be merged to generate the first prediction image 504 via a linear combination of pixels of the defect masks 406. For example, the properties of equivalent pixels in the defect masks 406 may be combined or merged to generate a particular pixel of the prediction image 504. Because the defect masks 406 are all generated based on image data acquired from the same relative position, a particular pixel at a given set of 2D coordinates in one defect mask 406 represents the same object depicted by equivalent pixels in the other defect masks 406 at the same coordinates. The equivalent pixels of the defect masks 406 may be combined or merged by averaging pixel characteristics (e.g., intensity, wavelength, etc.), summing pixel characteristics, overlaying equivalent pixels on each other, or the like.

The linear combination may be applied to these pixels to merge the properties and/or characteristics of the equivalent pixels for generating the prediction mask 504. The linear classifier or regression 502 may include one or more processors. The linear classifier or regression 502 may be configured to perform the linear combination by examining the pixels using a machine learning algorithm that is trained to weight the pixels differently based on the feature values (e.g., properties and/or characteristics) of the pixels. For example, if three out of the four defect masks 406 classify a particular pixel as having a first object class, then the resulting pixel in the prediction image 504 is more heavily weighted as having the first object class than if only two of the defect masks 406 classified that pixel as having the first object class. Alternatively, the linear classifier or regression 502 may combine the pixels utilizing heuristics, such as by calculating an average, a median, or the like. In the illustrated embodiment, the prediction image 504 has a candidate region 506 that is based on the candidate regions 412 of the set 408 of defect masks 406. The candidate region 506 contains image data associated with a potential defect along the surface 134 of the work piece 120.

The prediction image 504 shown in FIG. 5 is a first prediction image 504 that is associated with the first position 202 (shown in FIG. 2) of the imaging device 108 relative to the work piece 120. In an embodiment, the initial processing stage additionally includes generating at least a second prediction image that is associated with the second position 204 of the imaging device 108 relative to the work piece 120. For example, the steps shown in FIGS. 4 and 5 are repeated using the second set 306 of images 302 (e.g., images 302D-302F) as the input images to the neural network 402 in FIG. 4. The neural network 402 generates output images (e.g., defect masks) based on the second set 306 of images 302, and the output images are fused using the linear classifier or regression 502 to produce the second prediction image.

Figure 6:
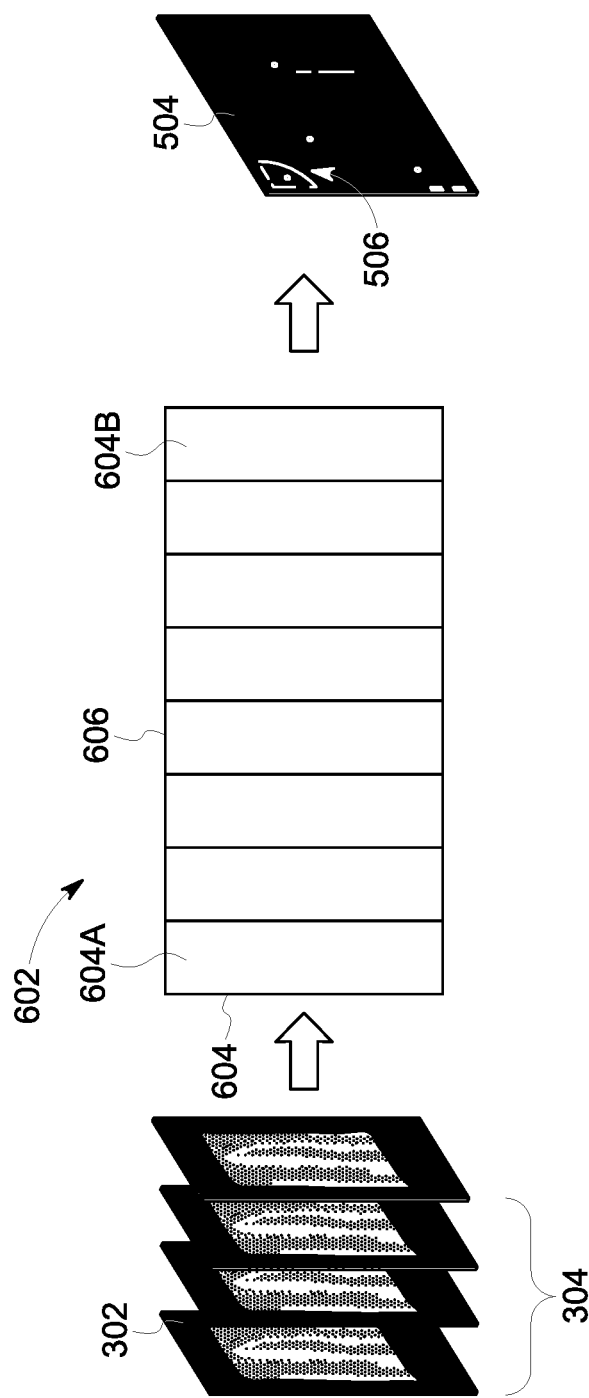
FIG. 6 illustrates the first set of images poised for examination using an artificial neural network during the initial processing stage according to an alternative embodiment.

FIG. 6 illustrates the first set 304 of images 302 poised for examination using an artificial neural network 602 during the initial processing stage according to an alternative embodiment. The embodiment shown in FIG. 6 may replace the steps shown in FIGS. 4 and 5. The artificial neural network 602 (also referred to as neural network 602) shown in FIG. 6 may be a modified convolutional neural network that is at least partially different than the neural network 402 in FIG. 4. For example, the neural network 602 includes various layers 604 of artificial neurons, and at least one of the layers 604 is a long term short term memory (LSTM) layer 606. The LSTM layer(s) 606 are configured to weight features depicted in the images 302 and to fuse information extracted from multiple images 302 in the set 304 to generate the first prediction image 504. The LSTM layer(s) 606 are recurrent neural network layers that have memory cells that can remember and integrate information over multiple instances (e.g., across the evaluations of different input images 302). More specifically, each LSTM layer 606 may be a 2D convolutional LSTM layer.

In the illustrated embodiment, the images 302 of the first set 304 are input to the input layer 604A and examined one by one in the forward propagation direction through the layers 604 of the neural network 602. The LSTM layer(s) may automatically learn to weight the features from the different images 302. The neural network 602 is configured to fuse the information extracted from the multiple images 302 into the single prediction image 504. The LSTM layer 606 shown in FIG. 6 is located in the middle of the neural network 602 and provides early fusion by essentially fusing the features from the multiple different images 302 in the first set 304. Alternatively, the LSTM layer 606 may be disposed towards the output end of the neural network 602 proximate to the output layer 604B, where the LSTM layer 606 provides late fusion by fusing the predicted scores (e.g., vector classifications).

As shown in FIG. 6, the neural network 602 utilizes the multiple images 302 of the first set 304 as inputs, and generates a single prediction image 504 based on the first set 304. The prediction image 504 is comparable to the prediction image 504 generated by the linear classifier or regression 502 shown in FIG. 5. For example, the prediction image 504 in FIG. 6 may include at least one candidate region 506 that contains a potential defect. By utilizing the LSTM layer(s) 606 in the neural network 602, the prediction image 504 can be generated in one step from the raw images 302 instead of in two steps as described with reference to FIGS. 4 and 5. For example, the neural network 602 does not generate a set of output images similar to the set 408 shown in FIGS. 4 and 5.

After the neural network 602 generates the first prediction image 504 based on the first set 304 of images 302, the second set 306 of images 302 may be input into the neural network 602 to generate a second prediction image. As described above, the different prediction images are based on different positions of the imaging device 108 relative to the work piece 120, and may have different respective candidate regions that contain potential defects.

After the prediction images are generated during the initial processing stage, the prediction images are merged during the secondary processing stage to detect the presence or absence of at least one defect in the surface 134 of the work piece 120.

Figure 7:
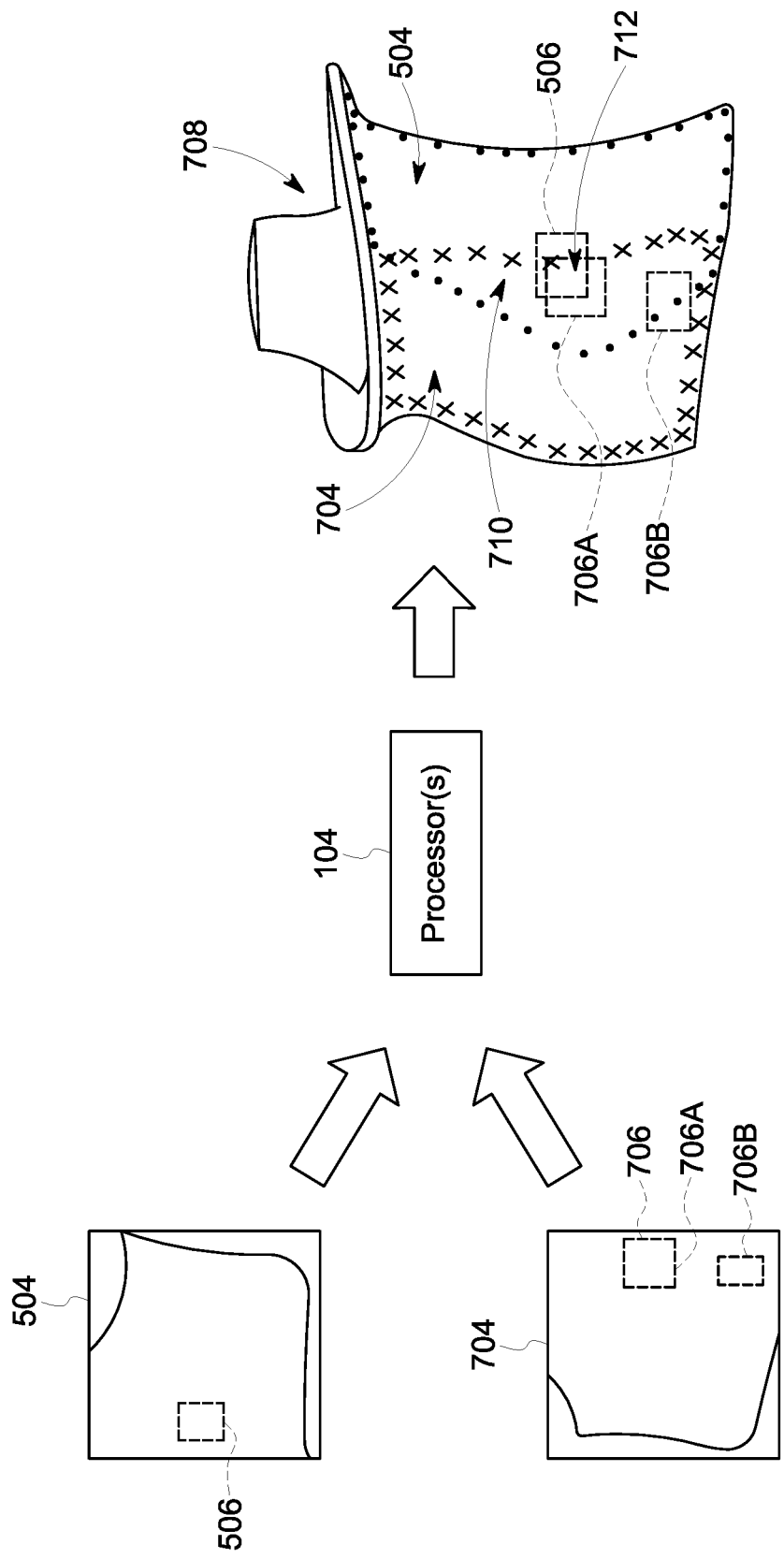
FIG. 7 illustrates the first prediction image and a second prediction image poised for analysis by one or more processors of the inspection system to merge the two prediction images according to an embodiment.

FIG. 7 illustrates the first prediction image 504 and a second prediction image 704 poised for analysis by the one or more processors 104 of the inspection system 100 to merge the two prediction images 504, 704 according to an embodiment. The first prediction image 504 is generated based on the first set 304 of images 302 captured by the imaging device 108 at the first position 202 (shown in FIG. 2). The second prediction image 704 is generated based on the second set 306 of images 302 captured by the imaging device 108 at the second position 204 (FIG. 2). The first prediction image 504 includes one candidate region 506 in FIG. 7. The second prediction image 704 has two candidate regions 706 (e.g., regions 706A and 706B) in FIG. 7. The candidate regions 506, 706 are delineated by rectangular bounding boxes. The candidate regions 506, 706 are identified during the initial processing stage described with reference to FIGS. 4 through 6.

During the secondary processing stage, the one or more processors 104 merge the first and second prediction images 504, 704 to analyze the prediction images 504, 704 and determine whether the candidate regions 506, 706 contain actual defects or false positives. The one or more processors 104 may merge the prediction images 504, 704 by mapping the prediction images 504, 704 to a computer design model 708 that simulates the work piece 120. For example, FIG. 7 illustrates a computer design model 708 of the work piece 120 with both the first and second prediction images 504, 704 mapped onto the model 708 in the respective locations and orientations. The computer design model 708 may be a three-dimensional (3D) model that has points (e.g., voxels) representing the work piece 120 in a 3D computer coordinate system. The computer design model 708 may be a scale representation of the work piece 120. The computer design model may be a computer-aided design (CAD) model or the like. The one or more processors 104 may obtain the computer design model 708 from an external source via the communication device 112 or a wired port or drive, and the model 708 may be stored, at least temporarily, within the memory 106.

The prediction images 504, 704 are mapped to the computer design model 708 of the work piece 120 to orient and align features captured in the two-dimensional images with corresponding physical features of the three-dimensional work piece 120. The processors 104 may be able to map the prediction images 504, 704 to the computer design model 708 by generating a transfer function that is based on the known positions 202, 204 of the imaging device 108 relative to the work piece 120 during the image acquisition stage. Mapping the two prediction images 504, 704 also allows for comparisons between the respective candidate regions 506, 706, which are used to generate a final prediction about the presence of defects.

In FIG. 7, the boundary of the first prediction image 504 that is visible on the illustrated orientation of the computer design model 708 has a dotted outline, and the boundary of the second prediction image 704 has an "x" outline. The two prediction images 504, 704 overlap one another in the overlap area 710. In the illustrated embodiment, the candidate region 506 of the first prediction image 504 at least partially overlaps with the first candidate region 706A of the second prediction image 704 within the overlap area 710. According to an embodiment, the one or more processors 104 may factor the amount of overlap between the respective candidate regions 506, 706A of the different prediction images 504, 704 in the determination of whether the image data depicts a defect. For example, a large amount or percentage of overlap indicates that a potential defect is detected in the same area from two different positions of the imaging device 108 relative to the work piece 120, which increases the probability that the area includes a defect. The large amount or percentage of overlapping candidate regions increases the probability that such area has a defect. On the other hand, if candidate regions 506, 706 within the overlap area 710 do not substantially overlap, then the different viewpoints produce different estimated defect locations, which reduces the probability that either of the candidate regions 506, 706 has a defect.

In the illustrated embodiment, the candidate region 506 of the first prediction image 504 substantially overlaps the candidate region 706A of the second prediction image 704, such that the amount of overlap exceeds a designated threshold. Optionally, the threshold may be 50% (or another percentage) of the surface area of the candidate region 506 or the candidate region 706A. In an embodiment, due to the substantial overlap, the one or more processors 104 may predict that the candidate region 506 and/or the candidate region 706A contain a defect. Therefore, the one or more processors 104 may detect a predicted defect in the surface 134 of the work piece 120 in an area corresponding to the candidate region 506 and/or the candidate region 706A. Optionally, the one or more processors 104 may specify an overlap region 712, which is defined by the area of overlap between the two candidate regions 506, 706A, as the location of the predicted defect in the surface 134 of the work piece 120.

In FIG. 7, a substantial portion of the second candidate region 706B of the second prediction image 704 is disposed in the overlap region 710, but the first prediction image 504 does not identify a candidate region nearby. The one or more processors 104 may determine that the second candidate region 706B is less likely to contain a defect than the first candidate region 706A due to the lack of corroboration by the other prediction image 504. The one or more processors 104 may classify the second candidate region 706B as a false positive or may perform additional analysis in the area corresponding to the second candidate region 706B.

In an embodiment in which three or more prediction images are merged by mapping onto the computer design model 708, the prediction images may have more overlap. For example, there may be areas in which three or more prediction images overlap one another. The one or more processors 104 may consider how many of the prediction images have overlapping candidate regions and the extent of overlap to make the determination about whether or not a defect is predicted within the candidate regions. For example, the one or more processors 104 may flag a designated area as having a predicted defect if multiple candidate regions of different prediction images overlap one another in that area beyond a designated threshold amount. In another example, the one or more processors 104 may flag a designated area as having a predicted defect if three or more candidate regions of different prediction images overlap one another in that area to any extent (e.g., without regard to a threshold amount).

Figure 8:
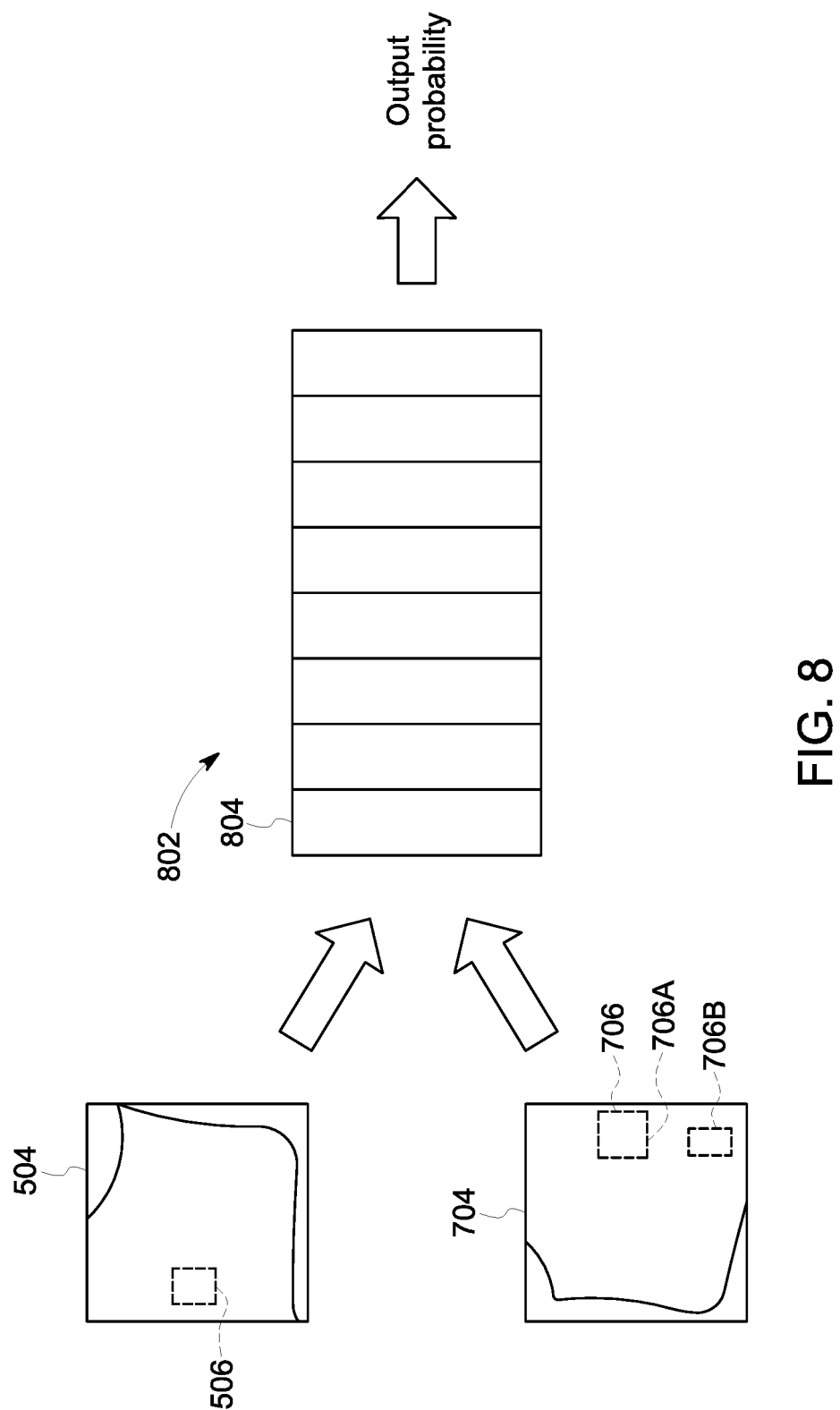
FIG. 8 illustrates an artificial neural network that is trained to receive the first and second prediction images as inputs and to generate an output probability based on the prediction images.

In another embodiment, the one or more processors 104 are configured to merge the first and second prediction images 504, 704 by examining the prediction images 504, 704 as inputs in a forward propagation direction through layers of artificial neurons in another artificial neural network. For example, FIG. 8 illustrates an artificial neural network 802 that is trained to receive the first and second prediction images 504, 704 as inputs and to generate an output probability based on the prediction images 504, 704. The artificial neural network 802 may be utilized by the control circuit 102 during the secondary processing stage to examine the prediction images 504, 704. The output of the neural network 802 is a probability that the candidate regions 506, 706 (or, more generally, the prediction images 504, 704) depict a defect in the surface 134 of the work piece 120. The artificial neural network 802 has layers 804 of artificial neurons, similar to the other neural networks 402, 602 described herein. The artificial neural network 802 may include one or more LSTM layers, similar to the neural network 602 shown in FIG. 6. The artificial neural network 802 differs from the neural networks 402, 602 described herein because the neural network 802 is specifically trained to examine and evaluate the prediction images 504, 704 as input images, whereas the neural networks 402, 602 are trained to examine and evaluate raw images 302 of the work piece 120.

The artificial neural network 802 may perform a deep learning algorithm and/or a linear classifier or regression to generate the output probability. The output probability may be a number between zero and one, such as 0.3, 0.6, or 0.8, or a percentage between 0% and 100%, such as 30%, 60%, or 80%. The output probability indicates a confidence level that the prediction images 504, 704 (or the candidate regions 506, 706 thereof) depict at least one defect, such as a crack, spalling, chip, abrasion, or the like. For example, an output probability of 0.8 or 80% indicates an 80% chance that the prediction images 504, 704 depict a defect.

According to at least one embodiment, the control circuit 102 (e.g., the one or more processors 104 thereof) is configured to detect at least one predicted defect in the prediction images 504, 704 if the output probability from the neural network 802 is greater than a designated probability threshold. In a non-limiting example, the designated probability threshold may be 0.5 (e.g., 50%), 0.7 (e.g., 70%), 0.75 (e.g., 75%), or the like. The probability threshold may be selected or modified by an operator using the I/O device 122.

After inspecting the work piece 120 and determining whether or not the work piece 120 has any predicted defects, the control circuit 102 (e.g., the one or more processors 104 thereof) may take one or more responsive or remedial acts. If one or more predicted defects are detected, the control circuit 102 may generate a control signal that is configured to segregate the work piece 120 from other work pieces lack at least one predicted defect (e.g., do not have any predicted defects) based on the inspection. For example, the control signal may schedule the work piece 120 for maintenance and/or repair and/or may command a robot or other machine to deposit the work piece 120 in a group with other work pieces that have predicted defects. Additional inspection techniques may be utilized on the work pieces 120 with defects to determine whether to discard the work pieces 120, repair the work pieces 120, or use the work pieces 120 as is without repair. Optionally, the control signal may be directed to the I/O device 122 to notify the operator that at least one defect is detected. If the inspection fails to detect any predicted defects, another control signal may be generated to group the work piece 120 with other work pieces that have passes the inspection. The work piece 120 may be advanced towards reassembly into the machine assembly. The result of the inspection and all associated details, such as the number, type, size, and location of any predicted defects may be recorded in a report that is stored in the memory 106 or another storage device. This data may be aggregated and studied to improve the inspection process and reduce part waste.

The inspection system 100 may be configured to consecutively inspect a multitude of work pieces 120. Once the image acquisition of the individual work piece 120 shown in FIG. 1 is complete, the work piece 120 is removed and replaced with another work piece 120 to be imaged. The inspection system 100 may be more efficient and accurate than some known manual inspection techniques.

Figure 9:
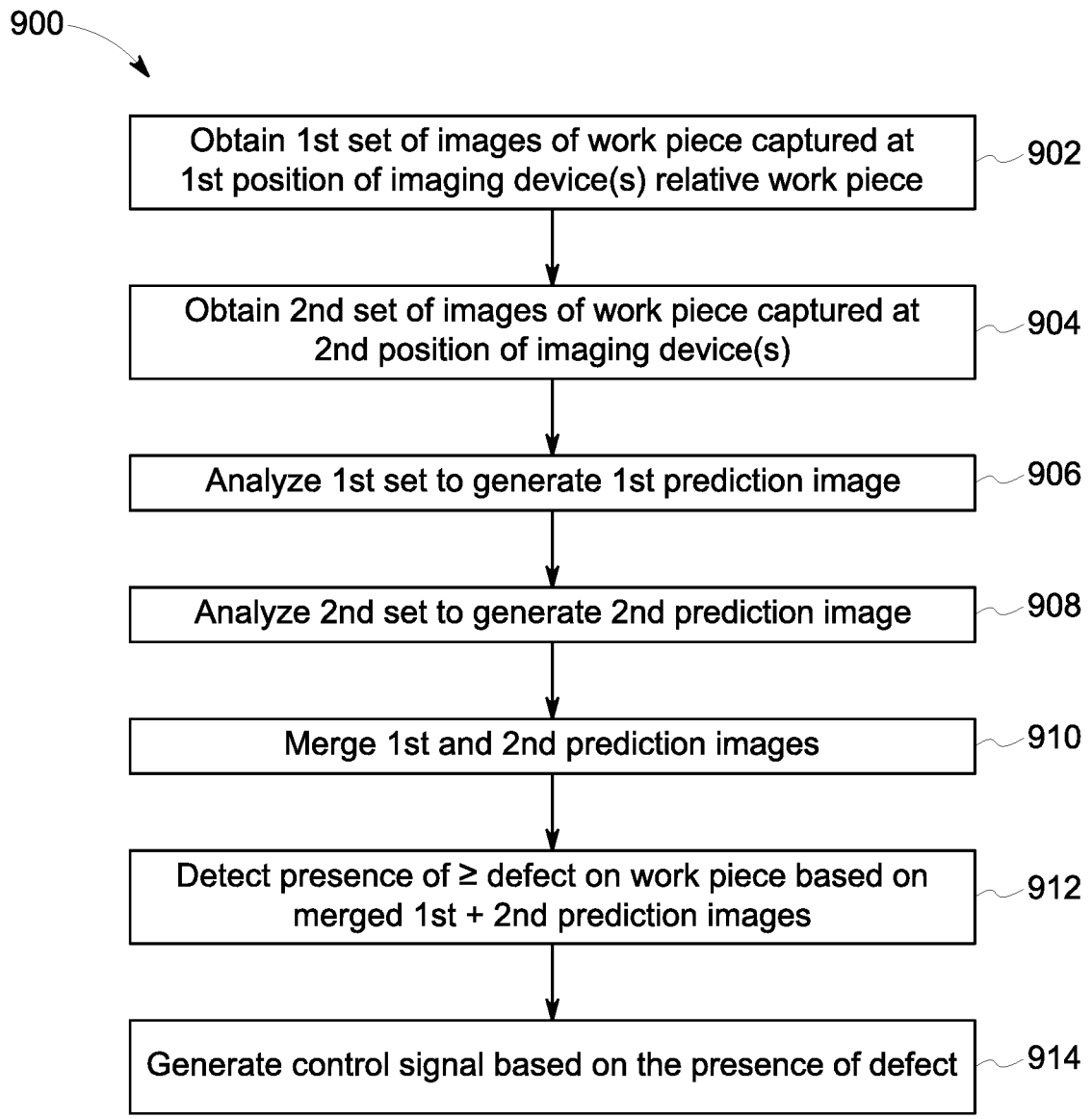
FIG. 9 is a flowchart of a method for inspecting a work piece for defects according to an embodiment.

FIG. 9 is a flowchart of a method 900 for inspecting a work piece for defects according to an embodiment. The method 900 may represent at least some of the operations performed by the control circuit 102, including the one or more processors 104 thereof, of the inspection system 100 shown in FIG. 1. The method 900 may represent an algorithm used to create (e.g., write) one or more software applications that direct operation of one or more processors 104 of the control circuit 102. The method 900 may include additional steps, fewer steps, and/or different steps than the illustrated flowchart in FIG. 9 in an alternative embodiment.

Referring to FIGS. 1 through 8, the method 900 begins at 902, at which a first set 304 of images 302 of a work piece 120 is obtained. The first set 304 is generated by one or more imaging devices 108 at a first position 202 relative to the work piece 120. At least some of the images 302 in the first set 304 are acquired in different light settings, such as different locations of active, light-emitting light sources, different types of active light sources, different wavelengths of light, and/or different intensities of light. At 904, a second set 306 of images 302 of the same work piece 120 is obtained. The second set 306 is generated by the one or more imaging devices 108 at a second position 204 relative to the work piece 120. At least some of the images 302 in the second set 306 are acquired using different light settings in the surrounding environment.

At 906, the first set 304 of images 302 is analyzed via one or more processors 104 to generate a first prediction image 504 associated with the first position 202 of the one or more imaging devices 108. At 908, the second set 306 of images 302 is analyzed by the one or more processors 104 to generate a second prediction image 704 associated with the second position 204 of the one or more imaging devices 108. The first prediction image 504 and the second prediction image 704 may include respective candidate regions 506, 706 that depict potential defects in the surface 134 of the work piece 120.

At 910, the first and second prediction images 504, 704 are merged via the one or more processors 104. At 912, the presence (or absence) of at least one defect in the surface 134 of the work piece 120 is detected based on the merged first and second prediction images 504, 704. At 914, a control signal is generated based on the presence or absence of the at least one defect in the surface 134 of the work piece 120. The control signal may be configured to group the work piece 120 with other work pieces that have similar inspection results as the work piece 120, such that work pieces with detected defects are grouped separately from work pieces without detected defects. The control signal may be configured to notify an operator, schedule maintenance, record information about the inspection of the work piece in a database, and/or the like.

The inspection system and method according to the embodiments described herein may provide various technical effects and advances over some known inspection systems and methods, such as improved accuracy, repeatability, consistency, robustness, and/or efficiency. For example, at least one technical effect is improved accuracy in the inspection (e.g., reduced errors) due to the use of multiple images of the same work piece captured from different positions of the imaging device and under different light settings. Acquiring images from different camera perspectives and light configurations reduces errors attributable to shadows, specular reflection, lighting variations, view point variations, and the like. Furthermore, utilizing machine learning algorithms to analyze the image data may increase the accuracy, repeatability, and consistency relative to manual inspection due to the avoidance of inherent human subjectivity. Another technical effect may be increased efficiency due to the inspection process described herein being fully or at least partially automated.

In one or more embodiments, an inspection system includes one or more imaging devices and one or more processors. The one or more imaging devices are configured to generate a first set of images of a work piece at a first position of the one or more imaging devices relative to the work piece, and to generate a second set of images of the work piece at a second position relative to the work piece. At least some of the images in the first set are acquired using different light settings, and at least some of the images in the second set are acquired using the different light settings. The one or more processors are configured to obtain the first set of images and to analyze the first set to generate a first prediction image associated with the first position of the one or more imaging devices. The one or more processors are also configured to obtain the second set of images and to analyze the second set to generate a second prediction image associated with the second position of the one or more imaging devices. The first and second prediction images include respective candidate regions that depict a potential defect in a surface of the work piece. The one or more processors are configured to merge the first prediction image and the second prediction image to detect at least one predicted defect on the surface of the work piece. The at least one predicted defect is depicted in at least one of the candidate regions of the first and second prediction images.

Optionally, the inspection system further includes multiple light sources operably connected to the one or more processors and configured to generate illumination light towards the surface of the work piece. The one or more processors are configured to control the light sources to provide the different light settings by changing a wavelength of the illumination light, changing an intensity of the illumination light, activating a first light source of the light sources to generate the illumination light, deactivating the first light source of the light sources to cease generating the illumination light, and/or changing a position of at least one of the light sources.

Optionally, the one or more imaging devices in the second position have a different location and/or a different angle relative to the work piece than the one or more imaging devices in the first position.

Optionally, the one or more processors are configured to analyze the first set of images by examining the images one at a time as inputs in a forward propagation direction through layers of artificial neurons in an artificial neural network to generate a set of defect masks with each defect mask in the set based on a different one of the images in the first set. The one or more processors generate the first prediction image by merging the defect masks in the set. Optionally, the one or more processors are configured to merge the defect masks to generate the first prediction image via a linear combination of pixels of the defect masks.

Optionally, the one or more processors are configured to analyze the first set of images by examining the images one at a time as inputs in a forward propagation direction through layers of artificial neurons in an artificial neural network. The layers include at least one long term short term memory layer configured to weight features depicted in the images and to fuse information extracted from the images to generate the first prediction image.

Optionally, responsive to detecting the at least one predicted defect in the surface of the work piece, the one or more processors are configured to generate a control signal configured to segregate the work piece from other work pieces that lack at least one predicted defect.

Optionally, the one or more processors are configured to merge the first prediction image and the second prediction image by mapping the first prediction image and the second prediction image to a computer design model that simulates the work piece. The one or more processors map the first and second prediction images to the computer design model based on the first and second positions of the one or more imaging devices relative to the work piece.

Optionally, the one or more processors are configured to detect the at least one predicted defect in the surface of the work piece after merging the first and second prediction images by determining an amount of overlap between the respective candidate regions of the first prediction image and the respective candidate regions of the second prediction image.

Optionally, the one or more processors are configured to merge the first prediction image and the second prediction image by examining the first and second prediction images as inputs in a forward propagation direction through layers of artificial neurons in an artificial neural network that generates an output probability that at least one of the first and second prediction images depict a defect. The one or more processors detect the at least one predicted defect in the surface of the work piece responsive to the output probability exceeding a designated probability threshold.

In one or more embodiments, a method for inspecting a work piece for defects is provided. The method includes obtaining a first set of images of the work piece generated by one or more imaging devices at a first position of the one or more imaging devices relative to the work piece. At least some of the images in the first set are acquired using different light settings. The method includes obtaining a second set of images of the work piece generated by the one or more imaging devices at a second position of the one or more imaging devices relative to the work piece. At least some of the images in the second set are acquired using the different light settings. The method includes analyzing the first set of images via one or more processors to generate a first prediction image associated with the first position of the one or more imaging devices. The first prediction image includes a candidate region that depicts a potential defect in a surface of the work piece. The method includes analyzing the second set of images via the one or more processors to generate a second prediction image associated with the second position of the one or more imaging devices. The second prediction image includes a candidate region that depicts a potential defect in the surface of the work piece. The method also includes merging the first prediction image and the second prediction image via the one or more processors to detect at least one predicted defect on the surface of the work piece. The at least one predicted defect is depicted in at least one of the candidate regions of the first and second prediction images, Optionally, the method also includes modifying the light settings during the acquisition of the images in both the first and second sets by changing a wavelength of illumination light directed towards the surface of the work piece, changing an intensity of illumination light directed towards the surface of the work piece, changing a type of light source that is activated, changing a position of a light source that is activated, and/or changing a number of light sources that are activated.

Optionally, the first set of images is analyzed by examining the images one at a time as inputs in a forward propagation direction through layers of artificial neurons in an artificial neural network to generate a set of defect masks. Each defect mask in the set is based on a different one of the images in the first set. The first prediction image is generated by merging the defect masks in the first set. Optionally, the defect masks that are based on the images in the first set are merged together via a linear combination of pixels of the defect masks to generate the first prediction image.

Optionally, the first set of images is analyzed by examining the images one at a time as inputs in a forward propagation direction through layers of artificial neurons in an artificial neural network. The layers include at least one long term short term memory layer configured to weight features depicted in the images and to fuse information extracted from the images to generate the first prediction image.

Optionally, responsive to detecting the at least one predicted defect in the surface of the work piece, the method also includes generating a control signal configured to segregate the work piece from other work pieces that lack at least one predicted defect.

Optionally, the merging of the first prediction image and the second prediction image includes mapping the first prediction image and the second prediction image to a computer design model that simulates the work piece. The mapping is based on the first and second positions of the one or more imaging devices relative to the work piece.

Optionally, the merging of the first prediction image and the second prediction image includes determining an amount of overlap between the candidate region of the first prediction image and the candidate region of the second prediction image.

Optionally, the merging of the first prediction image and the second prediction image includes examining the first and second prediction images as inputs in a forward propagation direction through layers of artificial neurons in an artificial neural network that generates an output probability that at least one of the first and second prediction images depict a defect. The one or more processors detect the at least one predicted defect in the surface of the work piece responsive to the output probability exceeding a designated probability threshold.

In one or more embodiments, an inspection system includes one or more imaging devices and one or more processors. The one or more imaging devices are configured to generate a first set of images of a work piece at a first position of the one or more imaging devices relative to the work piece, and to generate a second set of images of the work piece at a second position relative to the work piece. At least some of the images in the first set are acquired using different light settings, and at least some of the images in the second set are acquired using the different light settings. The one or more processors are configured to analyze the first set of images to generate a first prediction image by examining the images of the first set one at a time as inputs in a forward propagation direction through layers of artificial neurons in a first artificial neural network. The one or more processors are configured to analyze the second set of images to generate a second prediction image by examining the images of the second set one at a time as inputs in the forward propagation direction through the layers of artificial neurons in the first artificial neural network. The first and second prediction images include respective candidate regions that depict a potential defect in a surface of the work piece. The one or more processors are configured to merge the first prediction image and the second prediction image by examining the first and second prediction images as inputs in a forward propagation direction through layers of artificial neurons in a different, second artificial neural network that generates an output probability that at least one of the first and second prediction images depicts a defect. The one or more processors are configured to detect at least one predicted defect on the surface of the work piece responsive to the output probability exceeding a designated probability threshold.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An inspection system comprising:
   one or more imaging devices configured to generate a first set of images of a work piece at a first position of the one or more imaging devices relative to the work piece and to generate a second set of images of the work piece at a second position relative to the work piece, wherein at least some of the images in the first set are acquired using different light settings and at least some of the images in the second set are acquired using the different light settings; and
   one or more processors configured to obtain the first set of images and analyze the first set to generate a first prediction image associated with the first position of the one or more imaging devices, the one or more processors also configured to obtain the second set of images and analyze the second set to generate a second prediction image associated with the second position of the one or more imaging devices, the first and second prediction images including respective candidate regions that depict a potential defect in a surface of the work piece,
   wherein the one or more processors are configured to merge the first prediction image and the second prediction image to detect at least one predicted defect in the surface of the work piece, wherein the at least one predicted defect is depicted in at least one of the candidate regions of the first and second prediction images.

2. The inspection system of claim 1, further comprising multiple light sources operably connected to the one or more processors and configured to generate illumination light towards the surface of the work piece, wherein the one or more processors are configured to control the light sources to provide the different light settings by one or more of changing a wavelength of the illumination light, changing an intensity of the illumination light, activating a first light source of the light sources to generate the illumination light, deactivating the first light source of the light sources to cease generating the illumination light, or changing a position of at least one of the light sources.

3. The inspection system of claim 1, wherein the one or more imaging devices in the second position have at least one of a different location or a different angle relative to the work piece than the one or more imaging devices in the first position.

4. The inspection system of claim 1, wherein the one or more processors are configured to analyze the first set of images by examining the images one at a time as inputs in a forward propagation direction through layers of artificial neurons in an artificial neural network to generate a set of defect masks, each defect mask in the set based on a different one of the images in the first set, wherein the one or more processors generate the first prediction image by merging the defect masks in the set.

5. The inspection system of claim 4, wherein the one or more processors are configured to merge the defect masks to generate the first prediction image via a linear combination of pixels of the defect masks.

6. The inspection system of claim 1, wherein the one or more processors are configured to analyze the first set of images by examining the images one at a time as inputs in a forward propagation direction through layers of artificial neurons in an artificial neural network, wherein the layers include at least one long term short term memory layer configured to weight features depicted in the images and to fuse information extracted from the images to generate the first prediction image.

7. The inspection system of claim 1, wherein, responsive to detecting the at least one predicted defect in the surface of the work piece, the one or more processors are configured to generate a control signal configured to segregate the work piece from other work pieces that lack at least one predicted defect.

8. The inspection system of claim 1, wherein the one or more processors are configured to merge the first prediction image and the second prediction image by mapping the first prediction image and the second prediction image to a computer design model that simulates the work piece, wherein the one or more processors map the first and second prediction images to the computer design model based on the first and second positions of the one or more imaging devices relative to the work piece.

9. The inspection system of claim 1, wherein the one or more processors are configured to detect the at least one predicted defect in the surface of the work piece after merging the first and second prediction images by determining an amount of overlap between the respective candidate regions of the first prediction image and the respective candidate regions of the second prediction image.

10. The inspection system of claim 1, wherein the one or more processors are configured to merge the first prediction image and the second prediction image by examining the first and second prediction images as inputs in a forward propagation direction through layers of artificial neurons in an artificial neural network that generates an output probability that at least one of the first and second prediction images depict a defect, wherein the one or more processors detect the at least one predicted defect in the surface of the work piece responsive to the output probability exceeding a designated probability threshold.

11. A method for inspecting a work piece for defects, the method comprising:
obtaining a first set of images of the work piece generated by one or more imaging devices at a first position of the one or more imaging devices relative to the work piece, wherein at least some of the images in the first set are acquired using different light settings;
obtaining a second set of images of the work piece generated by the one or more imaging devices at a second position of the one or more imaging devices relative to the work piece, wherein at least some of the images in the second set are acquired using the different light settings;
analyzing the first set of images via one or more processors to generate a first prediction image associated with the first position of the one or more imaging devices, the first prediction image including a candidate region that depicts a potential defect in a surface of the work piece;
analyzing the second set of images via the one or more processors to generate a second prediction image associated with the second position of the one or more imaging devices, the second prediction image including a candidate region that depicts a potential defect in the surface of the work piece; and
merging the first prediction image and the second prediction image via the one or more processors to detect at least one predicted defect in the surface of the work piece, wherein the at least one predicted defect is depicted in at least one of the candidate regions of the first and second prediction images.

12. The method of claim 11, further comprising modifying the light settings during the acquisition of the images in the first set and during the acquisition of the images in the second set by one or more of changing a wavelength of illumination light directed towards the surface of the work piece, changing an intensity of illumination light directed towards the surface of the work piece, changing a type of light source that is activated, changing a position of a light source that is activated, or changing a number of light sources that are activated.

13. The method of claim 11, wherein the first set of images is analyzed by examining the images one at a time as inputs in a forward propagation direction through layers of artificial neurons in an artificial neural network to generate a set of defect masks, each defect mask in the set based on a different one of the images in the first set, wherein the first prediction image is generated by merging the defect masks in the set.

14. The method of claim 13, wherein the defect masks that are based on the images in the first set are merged together via a linear combination of pixels of the defect masks to generate the first prediction image.

15. The method of claim 11, wherein the first set of images is analyzed by examining the images one at a time as inputs in a forward propagation direction through layers of artificial neurons in an artificial neural network, wherein the layers include at least one long term short term memory layer configured to weight features depicted in the images and to fuse information extracted from the images to generate the first prediction image.

16. The method of claim 11, wherein, responsive to detecting the at least one predicted defect in the surface of the work piece, the method comprises generating a control signal configured to segregate the work piece from other work pieces that lack at least one predicted defect.

17. The method of claim 11, wherein the merging of the first prediction image and the second prediction image includes mapping the first prediction image and the second prediction image to a computer design model that simulates the work piece, wherein the mapping is based on the first and second positions of the one or more imaging devices relative to the work piece.

18. The method of claim 11, wherein the merging of the first prediction image and the second prediction image includes determining an amount of overlap between the candidate region of the first prediction image and the candidate region of the second prediction image.

19. The method of claim 11, wherein the merging of the first prediction image and the second prediction image includes examining the first and second prediction images as inputs in a forward propagation direction through layers of artificial neurons in an artificial neural network that generates an output probability that at least one of the first and second prediction images depict a defect, wherein the one or more processors detect the at least one predicted defect in the surface of the work piece responsive to the output probability exceeding a designated probability threshold.

20. An inspection system comprising:
one or more imaging devices configured to generate a first set of images of a work piece at a first position of the one or more imaging devices relative to the work piece and to generate a second set of images of the work piece at a second position relative to the work piece, wherein at least some of the images in the first set are acquired using different light settings and at least some of the images in the second set are acquired using the different light settings; and
one or more processors configured to analyze the first set of images to generate a first prediction image by examining the images of the first set one at a time as inputs in a forward propagation direction through layers of artificial neurons in a first artificial neural network, the one or more processors configured to analyze the second set of images to generate a second prediction image by examining the images of the second set one at a time as inputs in the forward propagation direction through the layers of artificial neurons in the first artificial neural network, the first and second prediction images including respective candidate regions that depict a potential defect in a surface of the work piece,
wherein the one or more processors are configured to merge the first prediction image and the second prediction image by examining the first and second prediction images as inputs in a forward propagation direction through layers of artificial neurons in a different, second artificial neural network that generates an output probability that at least one of the first and second prediction images depicts a defect, and wherein the one or more processors are configured to detect at least one predicted defect in the surface of the work piece responsive to the output probability exceeding a designated probability threshold.

* * * * *